United States Patent
Parees et al.

(10) Patent No.: US 10,540,147 B2
(45) Date of Patent: Jan. 21, 2020

(54) ADD-ON IMAGE FOR A PLATFORM-AS-A-SERVICE SYSTEM

(71) Applicant: Red Hat, Inc., Raleigh, NC (US)

(72) Inventors: Benjamin Michael Parees, Burham, NC (US); Clayton Palmer Coleman, Raleigh, NC (US); Cesar Augusto Wong, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 41 days.

(21) Appl. No.: 15/054,569

(22) Filed: Feb. 26, 2016

(65) Prior Publication Data

US 2017/0249127 A1   Aug. 31, 2017

(51) Int. Cl.
*G06F 9/44* (2018.01)
*G06F 8/30* (2018.01)

(52) U.S. Cl.
CPC ........................... *G06F 8/30* (2013.01)

(58) Field of Classification Search
CPC ....................................................... G06F 8/30
See application file for complete search history.

(56) References Cited

U.S. PATENT DOCUMENTS

| | | | |
|---|---|---|---|
| 7,330,967 B1 | 2/2008 | Pujare et al. | |
| 7,343,560 B1* | 3/2008 | Tanner | G06F 8/63 709/220 |
| 8,260,821 B2 | 9/2012 | Chang et al. | |
| 8,549,144 B2 | 10/2013 | Khangaonkar et al. | |
| 8,856,723 B2 | 10/2014 | Lam | |
| 9,792,141 B1* | 10/2017 | Sethuramalingam | G06F 8/63 |
| 2004/0088694 A1* | 5/2004 | Ho | G06F 8/68 717/170 |
| 2004/0139308 A1* | 7/2004 | Foster | G06F 8/60 713/1 |
| 2011/0320799 A1* | 12/2011 | Lam | G06F 8/63 713/2 |
| 2013/0061228 A1 | 3/2013 | Prasad et al. | |
| 2014/0215452 A1* | 7/2014 | Hicks | G06F 8/65 717/172 |
| 2016/0028672 A1* | 1/2016 | Kaul | H04L 51/10 709/206 |

OTHER PUBLICATIONS

Sotelo (Web article:How to Build and Deploy Docker Images with Drone, dated Aug. 30, 2014, retrieved on Feb. 22, 2018, URL: http://paislee.io/how-to-build-and-deploy-docker-images-with-drone/).*

(Continued)

*Primary Examiner* — Hang Pan
(74) *Attorney, Agent, or Firm* — Lowenstein Sandler LLP

(57) ABSTRACT

Implementations provide for an add-on image framework for a Platform-as-a-Service (PaaS) system. A method of the disclosure includes launching a build container for a build process based on a base image of an application of a multi-tenant Platform-as-a-Service (PaaS) system. The base image provides a core functionality of the application. The method also includes providing a source code for the application to the build container. The method further includes extracting content from an add-on image and assembling an application image using the base image, the source code and the extracted add-on image content in the build container.

17 Claims, 7 Drawing Sheets

(56) References Cited

OTHER PUBLICATIONS

"VOSS Propels Business Process Automation into the Future", http://www.voss-solutions.com/technology/, 2015.
Amjad Afanah, et al. "Docker Compose Environment Variable Binding Examples—Java, Node.Js, PHP, Python, and Ruby on Rails", DCHQ; ProLeads; Fraunhofer Austria Research GmbH; Project Ricochet; http://dchq.co/blog/category/mongo%20replica%20set, Feb. 2, 2016.
Darkxenorider, "How to Interject Drivers for a Dell OEM Image?", https://community.spiceworks.com/topic/418321-how-to-interject-drivers-for-a-dell-oem-image, Dec. 9, 2013.
"Builds and Image Streams", https://docs.openshift.com/enterprise/3.0/architecture/core_concepts/builds_and_image_streams.html, accessed Feb. 9, 2016, 12 pages.
"What Tool can I use to Create and Deploy Windows 7 Images?", http://superuser.com/questions/77821/what-tool-can-i-use-to-create-and-deploy-windows-7-images, accessed Feb. 9, 2016, 3 pages.
"Add a Device Driver to an Online Windows PE Image", https://technet.microsoft.com/en-us/library/cc766220(v=ws.10).aspx, Microsoft 2016, 1 page.
"Builds, Developer Guide, OpenShift Origin Latest" https://docs.openshift.org/latest/dev_guide/builds.html#image-source, accessed Feb. 26, 2016, 41 pages.
"Allow Using an Image as Source for a Build", https://github.com/openshift/origin/pull/6324, GitHub, Inc. 2016, 5 pages.

* cited by examiner

ADD-ON IMAGE FOR A PLATFORM-AS-A-SERVICE SYSTEM

TECHNICAL FIELD

The implementations of the disclosure relate generally to Platform-as-a-Service (PaaS) systems and, more specifically, relate to an add-on image for a PaaS system.

BACKGROUND

A variety of Platform-as-a-Service (PaaS) system offerings exists that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on their computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional functionality on which the customer's program depends. For some such programs, this additional functionality can include components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware, instructional components, and provisioning hosting capabilities, providing the facilities to support the complete life cycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding.

DETAILED DESCRIPTION

Figure 1:
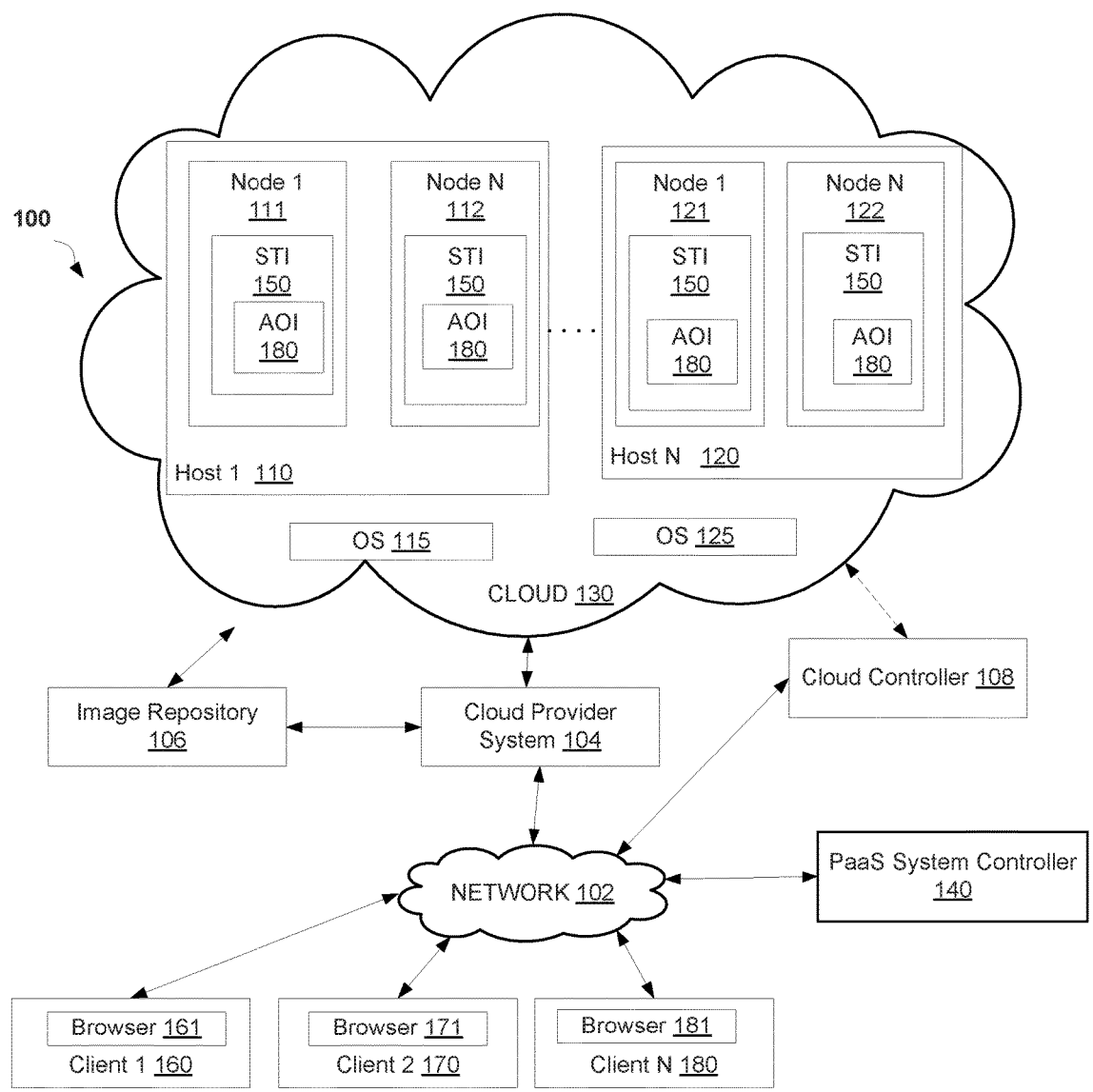
FIG. 1 is a block diagram that shows an example of a network architecture in which implementations of the disclosure may operate.

Implementations of the disclosure provide for an add-on image (AOI) framework for a Platform-as-a-Service (PaaS) system. Implementations provide an AOI component that is implemented as part of a PaaS system. The AOI component can be implemented on all nodes of the PaaS system or, alternatively, on a subset of the nodes of the PaaS system. In one implementation, the AOI component provides a logic framework to retrieve add-on images for applications of the PaaS system. An image may refer to data representing executables and files of an application used to deploy the application. An add-on image may include content that provides supplemental functionality for an application of the PaaS. The add-on image may include content such as drivers and configuration files (e.g., configuration scripts) that, when extracted from the add-on image and added to application image as the application image is being built, implement the supplemental functionality.

In one implementation, the add-on image provides content such as drivers and configuration scripts for a particular type of database server. The AOI component causes content to be extracted from the add-on image and inserted into an application image when the application image is built. As such, the add-on image is independent of source code of the application image. In one implementation, the content from the add-on image is utilized to configure a base image of the application image on which the application is to run. Accordingly, the add-on images not only provides static files such to be included in the application image but also provides a logic in the add-on image that allows to configure the base image to appropriately utilize the static files.

The AOI component enables combining content from an add-on image with user-provided source code for an application and a base image providing core functionality for the application (e.g., base framework used by the application). The content from the add-on image is incorporated into an assembly of the application image (i.e., base image+source code+add-on image content) for running the application on the PaaS system. Furthermore, the AOI component of implementations supports re-builds of application images when the content of the add-on image is updated. The AOI component 180 provides flexibility to the process for providing content on the add-on image that can be used for multiple of various application images utilized in running the application on the PaaS system.

Previous PaaS system solutions generally have not provided an add-on image framework for a multi-tenant PaaS environment. These solutions typically do not provide the flexibility to include content of an add-on image on-the-fly as part of a build process in a multi-tenant PaaS system. For example, one previous solution builds new base images to add-new drivers and then builds a new application image on top of the new base image. Another example of a previous solution is to include the drivers with the application source code However, these are time and resource-consuming options. Another solution could build a single application image that includes every possible supplemental functionality (e.g. every possible driver) that an end user may wish to utilize in the application. However, this solution is not only complex but also difficult to maintain and inefficient from an image size context. Implementations of the disclosure provide AOI logic to the multi-tenant PaaS system, where the AOI logic allows for content from add-on images to be combined with base images and source code for an application at build time of the resulting new application image each time an end user wants to add a new driver, thereby providing for an adaptable build and deployment process for an end user of the multi-tenant PaaS.

FIG. 1 is a block diagram of an example of a network architecture 100 in which implementations of the disclosure may operate. The network architecture 100 includes a cloud 130 managed by a cloud provider system 104. The cloud provider system 104 provides nodes 111, 112, 121, 122 to execute processes. In some implementations, these nodes are virtual machines (VMs) that are hosted on a physical machine, such as host 1 110 through host N 120, configured as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120. Users can interact with applications executing on the cloud-based nodes 111, 112, 121, 122 using client computer systems, such as clients 160, 170 and 180, via corresponding web browser applications 161, 171 and 181.

In some implementations, the host machines 110, 120 are often located in a data center. In other implementations, the applications may be hosted directly on hosts 1 through N 110-120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

Upon receiving a command identifying specific data (e.g., application data and files used to initialize an application on the cloud), the cloud provider 104 retrieves the corresponding data from the image repository 106, creates an instance of it, and loads it to the host 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, nodes 111, 112, 121, 122 include a source to image (STI) component 150. In some implementations, the STI component is also referred to as the S2I component. The STI component 150 can be implemented on each of the nodes 111, 112, 121, 122 of the PaaS system or, alternatively, on a subset of the nodes 111, 112, 121, 122. In one implementation, the STI component 150 provides a logic framework to produce ready-to-run application images for applications of the PaaS system. In one implementation, the STI component 150 includes an add-on image (AOI) component 180. In one implementation, the AOI component 180 provides content from an add-on image to be included in a ready-to-run application images for applications of the PaaS system. An image refers to data representing executables and files of an application used to deploy functionality for a runtime instance of the application. In one implementation, the content from the add-on image is included as part of the application image when it is built.

The content from the add-on image includes supplemental functionality, which may be used during execution of the application and/or to add a feature to the application. The content from the add-on image may include the dependencies and configuration files used to support the supplemental functionality to be added to the application. In one implementation, the content from the add-on image includes drivers and configuration scripts for the supplemental functionality. For example, the content from the add-on image includes a driver and corresponding dependencies and configuration scripts to implement a particular type of database server. Thus, the content provided by the add-on image is independent of a source code.

In one implementation, the supplemental functionality includes dependencies. A dependency identifies relationships between different pieces of applications. Such relationship may include specifics of the application and an attribute used to satisfy the specifics. The dependencies may include a driver. In one implementation, the supplemental functionality includes configuration scripts. A configuration script describes an application project and its operations. In one implementation, a configuration script is utilized to configure a base image of the application image on which the application is to run. Accordingly, the add-on images not only provides static files for inclusion in the application image, but also provides a logic that causes configuration of the base image to appropriately utilize the static files.

The AOI component 180 extracts content from the add-on image and provides the content to the STI component 150 to be assembled and included in a new application image. In one implementation, the content from the add-on image is combined with a user-provided source code for an application and a base image providing core functionality for the application (e.g., base framework used by the application) in order for the STI component 150 to assemble an application image (i.e., base image+source code+add-on image content) for running the application on the PaaS system. The AOI component 180 provides flexibility to the process for providing content from the add-on image, which can be used for multiple of various application images utilized in running the application on the PaaS system. Further details of the AOI logic 180 and its related workflows can be found below with respect to FIG. 2 through 5.

While various implementations are described in terms of the environment described above, the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
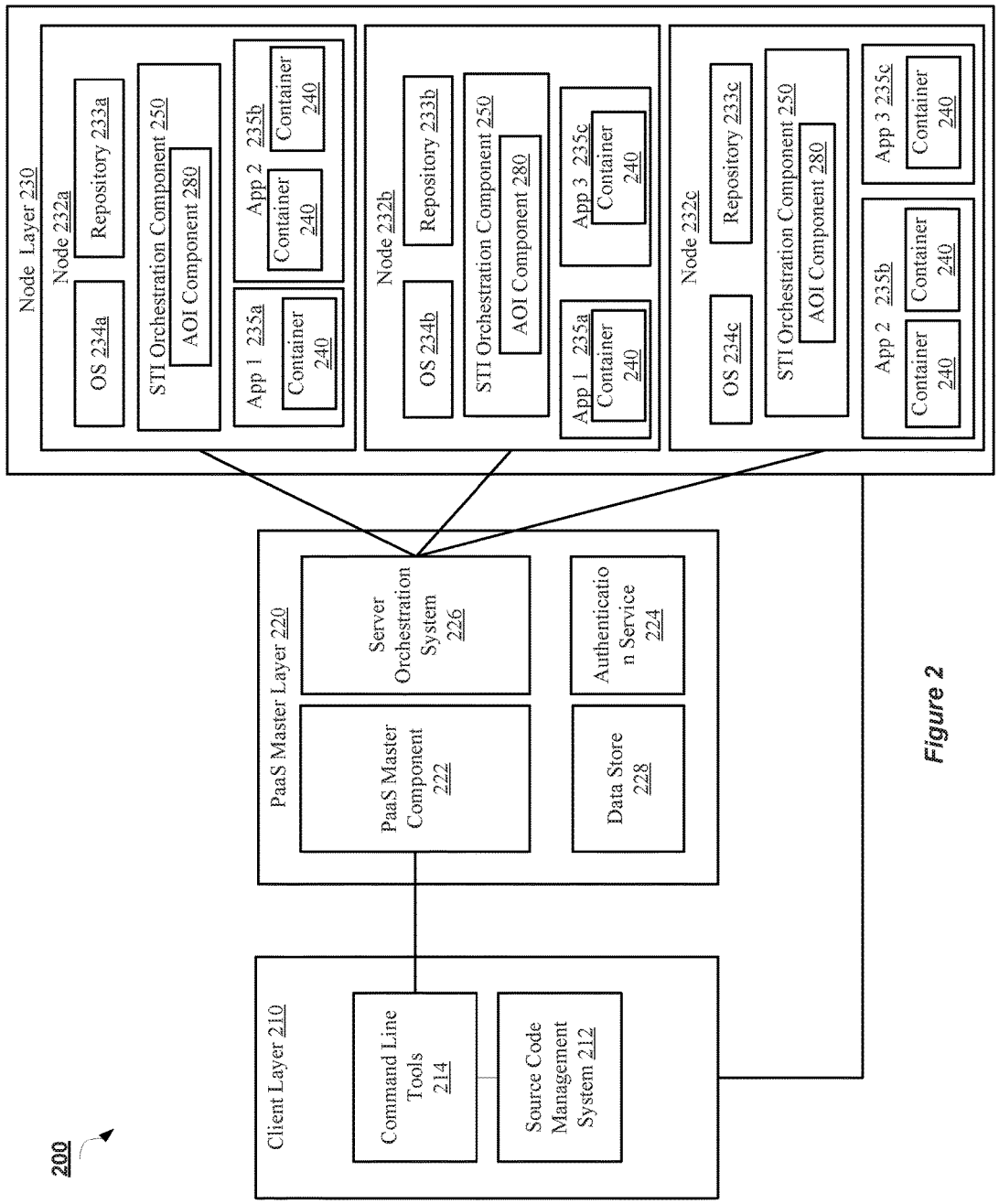
FIG. 2 is a block diagram that shows an example of a multi-tenant Platform-as-a-Service (PaaS) system architecture according to an implementation of the disclosure.

FIG. 2 is a block diagram of an example of a multi-tenant PaaS system architecture 200 according to an implementation of the disclosure. The PaaS architecture 200 allows users to launch applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a developer, and provides an interface to a user of the client machine to the PaaS master layer 220 of the PaaS system 200. In one implementation, the client machine can be a client 160, 170, 180 described with respect to FIG. 1. The PaaS master layer 220 may facilitate the creation and deployment on the cloud (via node layer 230) of applications being developed by an end user at client layer 210.

In one implementation, the client layer 210 includes a source code management system 212, sometimes referred to as "SCM" or revision control system. One example of such an SCM or revision control system is Git, available as open source application. Git and other such distributed SCM systems typically include a working directory for making changes, and a local repository for storing the changes for each application associated with the end user of the PaaS system 200. The packaged application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-b are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-b, deployment of source code of the application 235a-b, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-b residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a service provider. The PaaS master component 222 uses the information about the nodes 232a-c and their applications 235a-b to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-b that may be owned or managed by different users and/or organizations. As such, a first customer's deployed applications 235a-b may co-exist with any other customer's deployed applications on the same node 232 that is hosting the first customer's deployed applications 235a-b. In some implementations, portions of an application execute on multiple different nodes 232a-c. For example, as shown in FIG. 2, components of application 1 235a run in both node 232a and node 232b. Similarly, components of application 2 235b may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) to track and collect information about the node 232a-c and to perform management actions on the node 232a-c. The server orchestration system agent may operate in tandem with the server orchestration system 226 to send requests, queries, and commands between the node 232a-c and the PaaS master layer 220.

In one implementation, each node 232a-c may include an STI orchestration component 250. The STI orchestration component may be the same as STI component 150 described with respect to FIG. 1. In one implementation, the STI orchestration component 250 provides a logic framework to produce ready-to-run application images for applications 235a-c of the PaaS system. Each application image may map to a functional component of the application 235a-c. As such, an application may have more than one application image associated with the application.

In one implementation, the STI orchestration component 250 includes add-on image content (AOI) component 280. The AOI component 280 may be same as the AOI component 180 described with respect to FIG. 1. The AOI component 280 provides a logic framework to extract content from an add-on image and provide the content to the STI orchestration component to combine with a base image and application source code to produce the deployable application images for applications 235a-c of the PaaS system. As discussed above, an image may refer to data representing executables and files of an application used to deploy functionality for a runtime instance of the application. In one implementation, the content from the add-on image is included as part of the application image when it is built.

Also, as discussed above, the content from the add-on image includes supplemental functionality, which may be used during execution of the application and/or to add a feature to the application. The content from the add-on image may include the dependencies and configuration files used to support the supplemental functionality to be added to the application. In one implementation, the content from the add-on image provides drivers and configuration scripts for the supplemental functionality. For example, the content from the add-on image includes a driver and corresponding dependencies and configuration scripts to implement a particular type of database server. Thus, the supplemental functionality provided by the add-on image is independent of a source code.

In one implementation, the supplemental functionality includes dependencies. A dependency identifies relationships between different pieces of applications. Such relationship may include specifics of the application and an attribute used to satisfy the specifics. The dependencies may include a driver. In one implementation, the supplemental functionality includes configuration scripts. A configuration script describes an application project and its operations. In one implementation, the configuration script in the add-on image is utilized to configure a base image of the application image on which the application is to run. Accordingly, the add-on images not only provides static files for inclusion in the application image, but also provides a logic that causes configuration of the base image 364 to appropriately utilize the static files.

Each application image may map to a functional component of the application 235a-c. As such, an application may have more than one application image associated with the application For example, the application images may support languages such as, but not limited to, Java™, PHP, Ruby, Python, Perl, and so on. In addition, implementation, application images may be generated that support databases, such as MySQL™, PostgreSQL™, Mongo™, and others. Application images may also be generated that support build and continuous integration environments, such as a Jenkins-based image. Lastly, application images may be generated to support management capabilities and/or tools, such as PHP-myadmin, RockMongo™, 10 gen-mms-agent, cron scheduler, HAProxy, Maven, and Gradle for example.

The STI component 250 can be implemented on each of the nodes 111, 112, 121, 122 of the PaaS system or, alternatively, on a subset of the nodes 111, 112, 121, 122. In some implementations, a separate node 232a-c may be provided that is dedicated to implementing STI orchestration for all nodes 232a-c and applications 235a-c of the PaaS system 200.

The AOI component 280 of the STI component 250 provides flexibility to include supplemental functionality as desired by the end user for the process of creating a usable runtime image for the application in the PaaS system 200. The AOI component 280 allows for content from add-on images to be combined with base images and source code for an application at build time of the resulting application image, thereby providing for an adaptable build and deployment process for an end user of the multi-tenant PaaS. Further details of the application image build and deployment process are described below with respect to FIG. 3. Once the application image is build, the application image may be committed to a repository, such as repository 233a-c or to a remote repository (not shown) outside of nodes 232a-c. The committed application image may then be used to subsequently launch the application 235a-c.

As discussed above, the application images include supplemental functionality provided by the add-on image. In one implementation, an application 235a-c may utilize one or more resource-constrained containers 240 on nodes 232a-c using instances of application image. A container 240 is a resource-constrained process space on the node 232a-c to execute functionality of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) virtualization method. In further implementations, containers 240 may also be established using cgroups, SELinux™, and kernel namespaces, to name a few examples. In some implementations STI component 250 is implemented as a separate container 240 on nodes 232a-c.

Application image instances for an application 235a-c may be launched in containers 240 dispersed over more than one node 232a-b. In other implementations, application images instances for an application 235a-c may run in one or more containers 240 on the same node 232a-c. Furthermore, an application 235a-c may use more than one application image as part of providing functionality for the application 235a-c. One example of this is a JavaEE™ application that uses a JBoss™ application server-based application image with a supporting MySQL™ database provided by a MySQL™-based application image.

Figure 3:
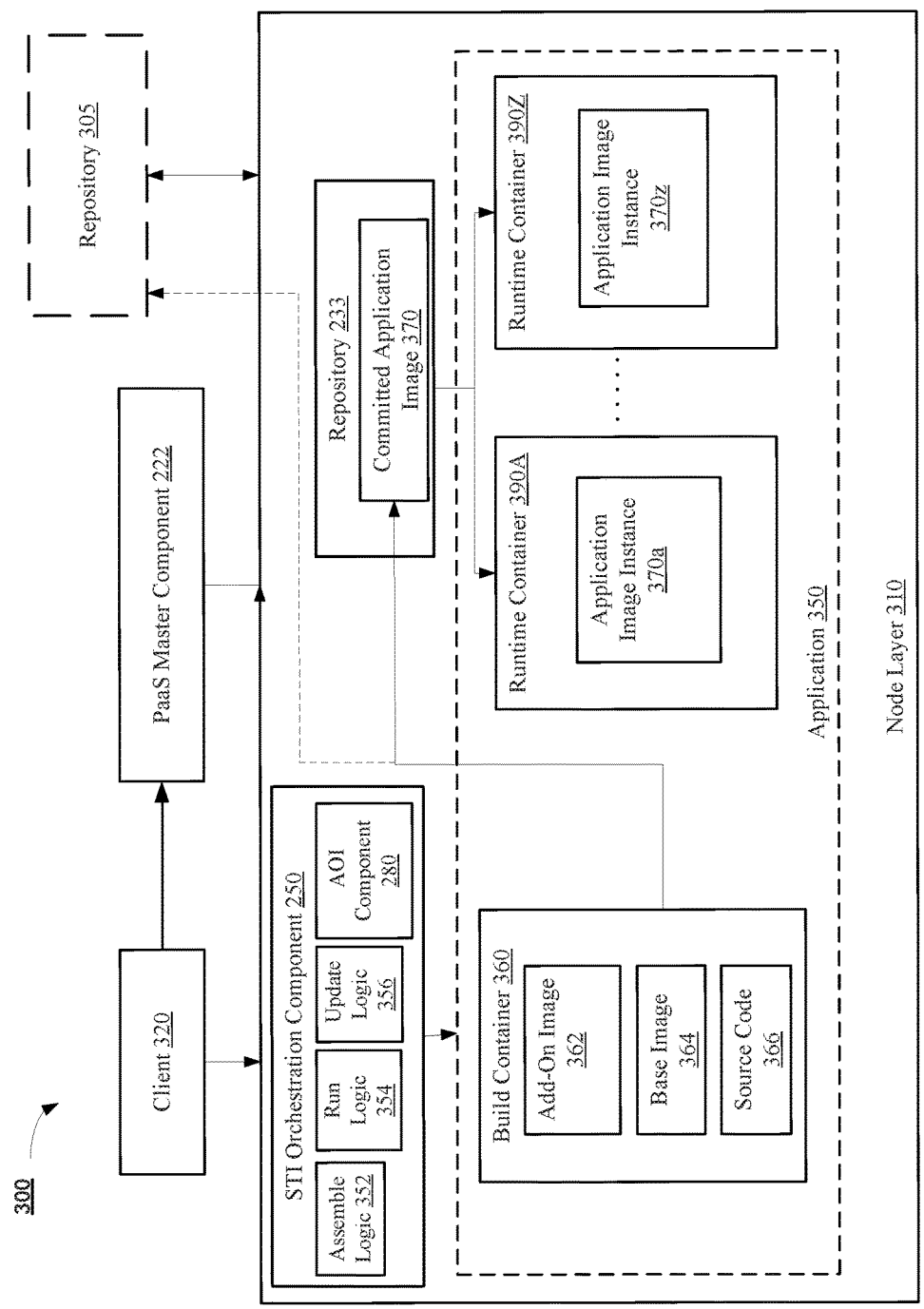
FIG. 3 is a block diagram that illustrates an example of a communication architecture of a multi-tenant PaaS providing an add-on image (AOI) framework to produce ready-to-run application images for applications of the multi-tenant PaaS system according to an implementation of the disclosure.

FIG. 3 is a block diagram of an example of a communication architecture 300 of a multi-tenant PaaS providing an AOI framework to enable the inclusion of content from add-on images with the base image(s) and source code used to generate the deployable application images. Architecture 300 includes the PaaS master component 222 in communication with a client 320 and node layer 310. Node layer 310 includes STI orchestration component 250, repository 233, and application 350 (which includes container 360 distributed across one or more nodes of node layer 310). PaaS master component 222, STI orchestration component 250, and repository 233 may be the same as their counterparts described with respect to FIG. 2.

In one implementation, PaaS master component 222 would receive a request to build an application (either via an API or another trigger event communicated from client 320). The PaaS master component 222 would then invoke STI orchestration component 250 to launch build container 360. The build container 360 may be a resource-constrained process space on the node layer 310 that executes functionality to combine content from an add-on image 362 to a base image 364 and source code 366 to create an application image. In some implementations, build container 360 is established with resource boundaries, including a limit and/or designation of the amount of memory, amount of storage, and security types and/or labels to be applied to any functions executed by the build container 360.

Build container 360 runs assemble logic 352 using a base image 364 registered for the requested application. In one implementation, the end user identifies the base image 364 when the end user registers the application with the multi-tenant PaaS system. This may allow end users to identify images external to the multi-tenant PaaS for use in the multi-tenant PaaS. The base image 364 may be maintained in a repository of the multi-tenant PaaS, such as repository 233 of node layer 310, or in a remote repository 305 maintained outside of node layer 310. The base image 364 may be associated with core functionality of the application, such as application frameworks including, but not limited to, PHP™, Ruby™, J2EE™, and so on.

In one implementation, the add-on image (AOI) component 280 is provided as part of the STI orchestration component 250. The AOI component 280 may retrieve a requested add-on image, extracts specific content (e.g., drivers, dependencies, configuration scripts, etc.) from the requested the add-on image and provides the content from the add-on image 362 to the STI orchestration component 250 to combine with a base image and user-provided source code as part of building a deployable application image for the PaaS system. In one implementation, the add-on image is stored in the repository 305. The user may request or identify the add-on image. The assemble logic 352 causes the build container 360 to assemble the base image 364, the application source code 366, and the content from the add-on image 362 together to generate a new application image. This new application may be stored as a committed application image 370 for use in deploying application instances.

The content from the add-on image 362 may be provided to the build container 360 by the AOI component 280. The content from the add-on image content is an already-existing content that may be specified (e.g., via an user interface (UI) or application programming interface (API)) by the end user (e.g., a software developer or system administrator) for inclusion in the build process for the application image. The content from the add-on image 362 may be indicated at a time of the build of the new application image.

As discussed above, the content from the add-on image 362 may include a driver and corresponding dependencies and configurations that provide the functionality of the add-on image 362. In one implementation, the dependency from the add-on image 362 is copied to appropriate system paths so the base image 364 can load them. Accordingly, the content of the add-on image 362 supplies the dependencies (e.g., drivers) to enable the application to implement the add-on image functionality. Also as discussed above, the content of the add-on image 362 may include a configuration script to enable functionality of the add-on image in the application. In one implementation, the configuration script from the add-on image 362 is copied into the application image being assembled. The configuration script when invoked may further modify the application image being assembled or perform other application assembly step such as building a code. In one implementation, the configuration script, when invoked by the build container 360 during the build process, would perform operations such as defining a data source in a server's configuration. As such, the configuration script in the add-on image 362 is utilized to configure the base image 364 of the application image on which the application is to run. Accordingly, the content from the add-on images retrieved by the AOI component 280 not only provides static files for inclusion in the application image, but also provides a logic that causes configuration of the base image to appropriately utilize the static files. In one implementation, the committed application image 370 contains drivers, configuration files, updated configuration mutated by the configuration scripts (as described below) and compiled application source code.

In one implementation, the application source code 366 and/or the add-on image 362 may be streamed, for example, as a TAR file to the build container 360. The application source code 366 and/or the add-on image 362 may be streamed from a client device of an end user, or from another remote location indicated by the user. In another implementation, the application source code 364 and/or the add-on image may be bind-mounted to the build container 360. In a further implementation, the application source code 364 and/or the add-on image may be accessed or downloaded using a remote Uniform Resource Locator (URL) provided to build container 360. In some implementations, when the source code 366 and/or the add-on image 362 is obtained via URL, the source code 366 and the add-on image 362 downloads are performed prior to the assemble logic 352 building/assembling the new application image and then streamed as part of a tar file provided to the build container 360 or used as part of a bind mount.

When the new application image is built, the assemble logic 352 run by build container 360 causes the application image to be committed to a repository 233, 305. The committed application image 370 may then be used to subsequently launch the application 350. STI orchestration component 250 may provide run logic 354 that defines behaviors to be executed when one or more runtime containers 390A-Z are launched from the committed application image 370. Multiple runtime containers 390A-Z may launch using instances 370a-z of built application image 370 in order to scale up the functionality provided by application image 370 in application 350.

In some implementations, assemble logic 352 and run logic 354 may be provided as part of the application image (e.g., as part of base image 364). In another implementation, the assemble logic 352 and run logic 354 may be external to the application image. The latter scenario allows end users that wish to utilize the base image 364 to be able to modify the assemble logic 352 and run logic 354 to perform differently. In addition, the later scenario allows end users to share the same scripts for the assemble logic 352 and run logic 354 across multiple different images.

In other implementations of the disclosure, the STI orchestration component 250 includes update logic 356, which detects an update in the content of the add-on image 362. The update logic 356 may detect an update in the functionality of the content in the add-on image 362. As discussed above, the add-on image 362 may include content such as drivers and their corresponding dependencies and/or configuration scripts that enable the application to utilize a particular feature (e.g., a database driver for a particular database server). In one implementation, the update logic 356 triggers the assemble logic 352 to build a new application image based on the update in the content of the add-on image 362. The new application image may be a rebuild of the application image previously built.

The assemble logic 352 provides a performance optimization for the STI framework by rebuilding the application image utilizing not only any updates in the base image 364 but also the updated content in the add-on image content 362. The assemble logic 352 may build a new application image using the base image 364, the application source code 366, and the updated content in the add-on image 362. As such, the assemble logic 352 provides an optimization for STI orchestration component 250 to more quickly and efficiently build application images, as well as allowing rebuilds of the application images to be performed using the updated content in the add-on image 362.

Figure 4A:
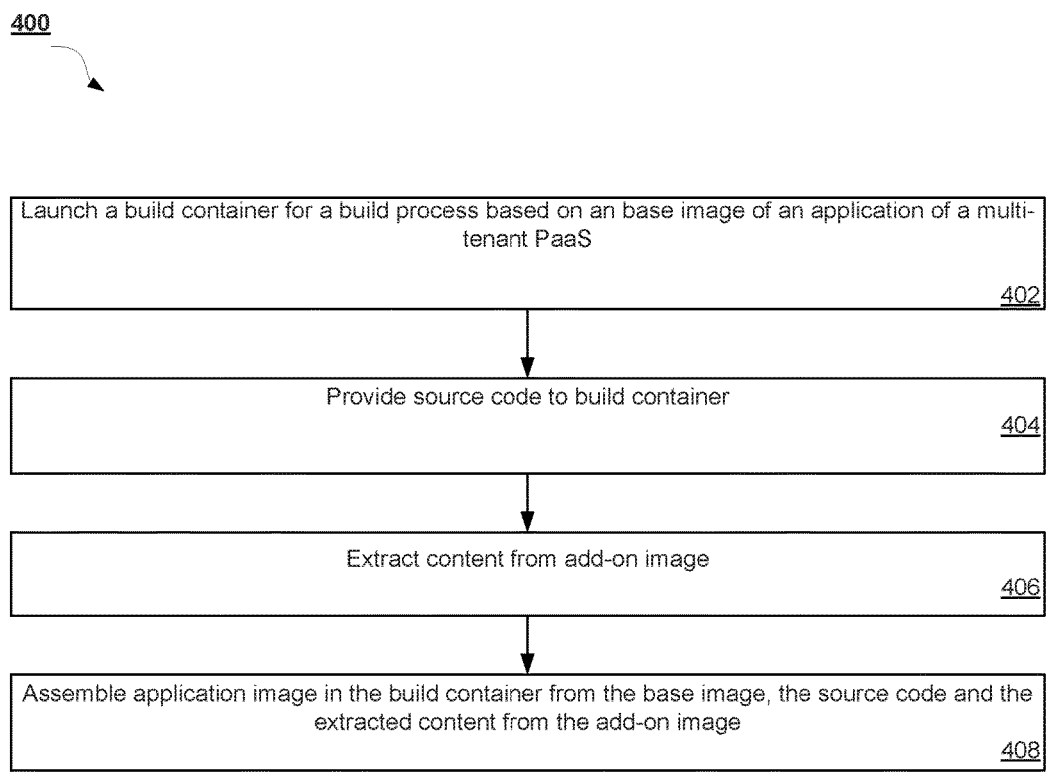
FIG. 4A is a flow diagram illustrating an example of a method for utilizing an AOI framework to build an executable image for an application in a PaaS system according to an implementation of the disclosure.

FIG. 4A is a flow diagram illustrating an example of a method 400 for utilizing an AOI framework to build a deployable application image for an application in a PaaS system according to an implementation of the disclosure. Method 400 may be performed by processing logic that may comprise hardware (e.g., circuitry, dedicated logic, programmable logic, microcode, etc.), instructions run on a processing device or a combination thereof. In one implementation, method 400 is performed by STI orchestration 250 of FIGS. 2 and 3.

Method 400 begins at block 402 where a build container for a build process is launched based on a base image of an application of a multi-tenant Platform-as-a-Service (PaaS) system. In one implementation, the base image provides a core functionality of the application. Subsequently at block 404, a source code for the application is provided to the build container. At block 406, content (e.g. drivers, dependencies, configuration scripts etc.) from an add-on image is extracted. In one implementation, an AOI component causes the content from the add-on image to be provided to the build container. The add-on image is included at a time when the application image is built. In one implementation, the AOI component is hosted in a container of a node. The node may be the same node that hosts the application or may be another node dedicated to builds using AOI component. In other implementation, the AOI component is a binary application executed on a host machine without the use of a container. In one implementation, an image may refer to data representing executables and files of an application used to deploy functionality for a runtime instance of the application. In one implementation, the add-on image is included as part of the application image when it is built. As discussed above, the content from the add-on image includes supplemental functionality, which may be used during execution of the application and/or to add a feature to the application. Also as discussed above, the content from the add-on image may include a driver and corresponding the dependencies and configuration files used to support the supplemental functionality to be added to the application.

At block 408, an application image is assembled in the build container using the base image, the source code, and the extracted content from the add-on image. The built application image is committed to a repository. In one implementation, the repository is on a node of the multi-tenant PaaS. In other implementations, the repository is external to the multi-tenant PaaS. In one implementation, the committed application image is used to launch the application in the multi-tenant PaaS. In one implementation, the configuration file is executed as part of the process of assembling the application image.

Figure 4B:
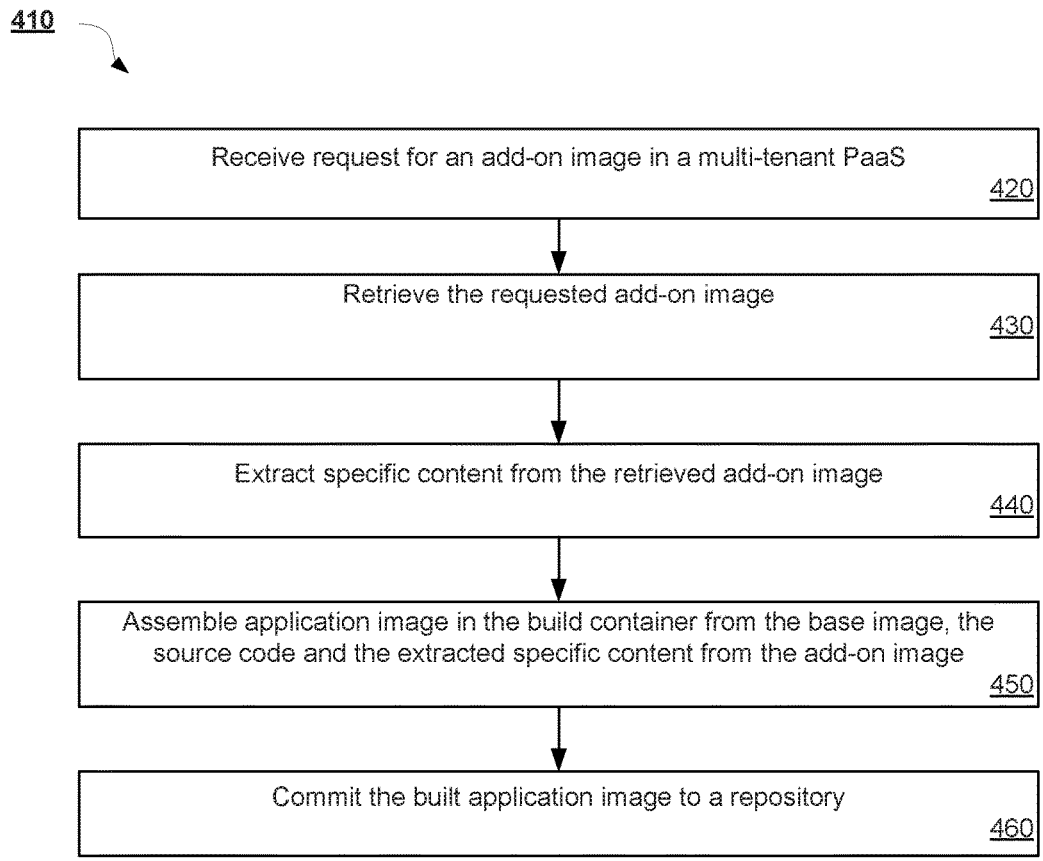
FIG. 4B is a flow diagram illustrating an example of a method for utilizing an AOI framework to build an executable image for an application in a PaaS system according to an implementation of the disclosure.

FIG. 4B is a flow diagram illustrating an example of a method 410 for utilizing an AOI framework to build a deployable application image for an application in a PaaS system according to an implementation of the disclosure. Method 410 may be performed by processing logic that may comprise hardware (e.g., circuitry, dedicated logic, programmable logic, microcode, etc.), instructions run on a processing device or a combination thereof. In one implementation, method 410 is performed by STI orchestration 250 of FIGS. 2 and 3.

Method 410 begins at block 420 where a request is received for an add-on image. In one implementation, a user may request the add-on image stored in a repository. In one implementation, an image may refer to data representing executables and files of an application used to deploy functionality for a runtime instance of the application. In one implementation, the add-on image is included as part of the application image when it is built. As discussed above, the add-on image includes supplemental functionality, which may be used during execution of the application and/or to add a feature to the application. Also as discussed above, an add-on image may include a driver and corresponding dependencies and configuration files used to support the supplemental functionality to be added to the application. At block 430, the requested add-on image is retrieved. At block 440, specific content (e.g. drivers, dependencies, configuration scripts etc.) from the retrieved add-on image is extracted.

Subsequently, at block 450, an application image is assembled in the build container from the base image, the source code, and the extracted specific content from the add-on image. In one implementation, an AOI component inserts the extracted specific content into the application image in the build container. The extracted specific content is inserted at a time when the application image is built. In one implementation, the AOI component is hosted in a container of a node. The node may be the same node that hosts the application or may be another node dedicated to builds using AOI component. In other implementation, the AOI component is a binary application executed on a host machine without the use of a container. In one implementation, the configuration file is executed as part of the process of assembling the application image. Then, at block 460, the built application image is committed to a repository. In one implementation, the repository is on a node of the multi-tenant PaaS. In other implementations, the repository is external to the multi-tenant PaaS. In one implementation, the committed application image is used to launch the application in the multi-tenant PaaS.

Figure 5:
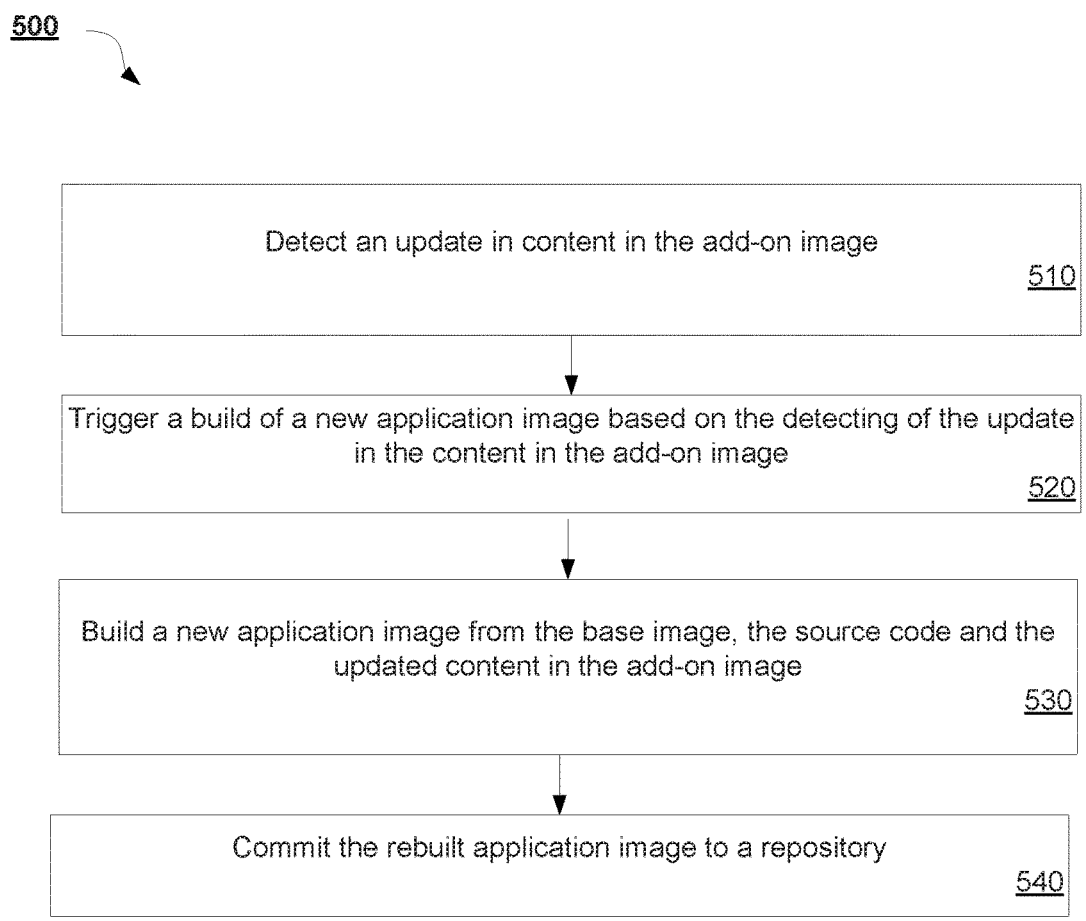
FIG. 5 is a flow diagrams illustrating an example of a method for utilizing an AOI framework to rebuild an executable application image in a PaaS system according to implementations of the disclosure.

FIG. 5 is a flow diagram illustrating an example of a method 500 for utilizing an AOI framework to rebuild an application image for an application in a PaaS system according to an implementation of the disclosure. Method 500 may be performed by processing logic that may comprise hardware (e.g., circuitry, dedicated logic, programmable logic, microcode, etc.), instructions run on a processing device or a combination thereof. In one implementation, method 500 is performed by performed by STI orchestration 250 of FIGS. 2 and 3.

Method 500 of FIG. 5 begins at block 510 where an update in content in the add-on image is detected. In one implementation, update logic is invoked to detect the update. In one implementation, the update logic is hosted in a container of a node. The node may be the same node that hosts the application or may be another node dedicated to the updates using update logic. In other implementation, the update logic is a binary application executed on a host machine without the use of a container. In one implementation, the functionality is provided by the add-on image via a dependency. In one implementation, the functionality is provided by the add-on image via a configuration script.

Subsequently, at block 520, trigger a build of a new application image based on the detecting of the update in the content in the add-on image. At block 530, a new application image in the build container is built from the base image, the source code, and the updated content in the add-on image. In one implementation, the new application image is a rebuild of the application image previously build. Then, at block 540, the new application image is committed to a repository. In one implementation, the repository is on a node of the multi-tenant PaaS. In other implementations, the repository is external to the multi-tenant PaaS. In one implementation, the committed new application image is used to launch the application in the multi-tenant PaaS.

Figure 6:
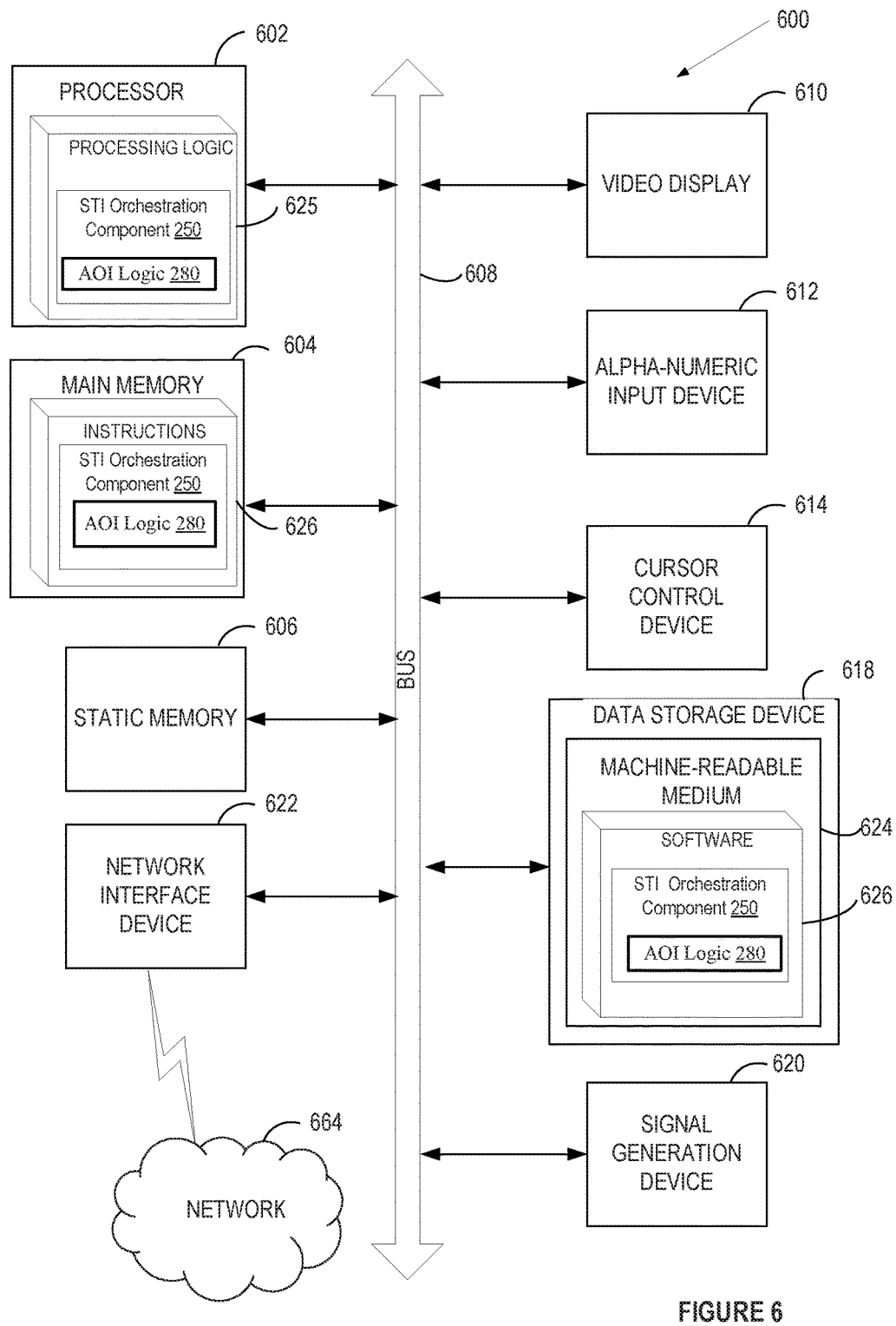
FIG. 6 illustrates a block diagram that shows one implementation of a computer system.

FIG. 6 illustrates an example of a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement AOI component 280 in a STI Orchestration Component 250 to include content from an add-on image with a base image and an application source code to generate a deployable application image for a PaaS system executed by a computer system, such as the computer system described with respect to FIG. 2, and/or a software library containing methods that call the above applications. While the machine-accessible storage medium 628 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding, or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, structures and devices are shown in block diagram form, rather than in detail, in order to avoid obscuring the disclosure.

Some portions of the detailed descriptions, which follow, are presented in terms of processes and symbolic representations of operations on data bits within a computer memory. These process descriptions and representations are the means used in the data processing arts. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "determining", "executing", "causing", "implementing", "launching", "accessing", "assembling", "committing", "updating", "rebuilding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The processes and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite those features regarded as the disclosure.

What is claimed is:

1. A method, comprising:

launching, by a processing device, a build container for a build process in view of a base image of an application of a multi-tenant Platform-as-a-Service (PaaS) system, the base image providing a core functionality of the application;

providing, by the processing device, source code for the application to the build container;

extracting content from an add-on image, wherein the content extracted from the add-on image comprises content that provides a supplemental functionality independent of the source code for the application, the content comprising a driver, corresponding dependencies, and at least one configuration script that configures the base image to utilize the driver and the corresponding dependencies to provide the supplemental functionality, and wherein the content extracted from the add-on image is independent of the base image and the source code of the application;

building, by the processing device, a first application image of the application using the base image, the source code, and the content extracted from the add-on image in the build container; and building, in the build container, a second application image of the application using the base image, the source code of the application, and an update corresponding to the content extracted from the add-on image.

2. The method of claim 1, wherein the content extracted from the add-on image comprises at least one of content that enables the application to implement the supplemental functionality or content that adds a feature to the application.

3. The method of claim 1, wherein building the first application image comprises executing the configuration script to configure the base image to utilize the corresponding dependencies.

4. The method of claim 1, further comprising committing, by the processing device, the first application image to a repository.

5. The method of claim 1, further comprising detecting the update corresponding to the content extracted from the add-on image.

6. The method of claim 5, further comprising triggering a build of the second application image in the build container in response to detecting the update.

7. The method of claim 6, wherein the build of the second application image comprises rebuilding the first application image in view of the update.

8. The method of claim 1, wherein the update corresponding to the content extracted from the add-on image comprises a new driver.

9. A system, comprising:
a memory;
a processing device communicably coupled to the memory, the processing device to:
identify a base image of an application of a multi-tenant Platform-as-a-Service (PaaS) system, the base image providing a core functionality of the application;
provide source code for the application at a build container, wherein the build container is launched in view of the identified base image;
extract content from an add-on image, wherein the content extracted from the add-on image comprises content that provides a supplemental functionality independent of the source code for the application, the content comprising a driver, corresponding dependencies, and at least one configuration script that configures the base image to utilize the driver and the corresponding dependencies to provide the supplemental functionality, and wherein the content extracted from the add-on image is independent of the base image and the source code of the application;
insert the content extracted from the add-on image into a first application image;
build the first application image using the base image, the source code, and the content extracted from the add-on image in the build container; and
build, in the build container, a second application image of the application using the base image, the source code of the application, and an update corresponding to the content extracted from the add-on image.

10. The system of claim 9, wherein the content extracted from the add-on image comprises at least one of content that enables the application to implement the supplemental functionality or content that adds a feature to the application.

11. The system of claim 9, wherein to build the first application image, the processing device is to execute the configuration script to configure the base image to utilize the corresponding dependencies.

12. The system of claim 9, wherein the processing device is to trigger a build of the second application image in the build container in response to detecting the update corresponding to the content extracted from the add-on image.

13. The system of claim 12, wherein the update corresponding to the content extracted from the add-on image comprises a new driver.

14. A non-transitory machine-readable storage medium including instructions that, when accessed by a processing device, cause the processing device to:
receive a request to perform a build associated with an application of a multi-tenant Platform-as-a-Service (PaaS) system;
determine a base image in view of the build associated with the application, wherein the base image provides a core functionality of the application;
launch a build container for a build process in view of the base image;
provide, by the processing device, a content from an add-on image to the build container, wherein the content from the add-on image comprises content that provides a supplemental functionality independent of source code for the application, the content comprising a driver, corresponding dependencies, and at least one configuration script that configures the base image to utilize the driver and the corresponding dependencies to provide the supplemental functionality, and wherein the content extracted from the add-on image is independent of the base image and the source code of the application;
build, by the processing device, a first application image using the base image, the source code, and the content from the add-on image in the build container; and
build, in the build container, a second application image of the application using the base image, the source code of the application, and an update corresponding to the content extracted from the add-on image.

15. The non-transitory machine-readable storage medium of claim 14, wherein the content from the add-on image comprises at least one of content that enables the application to implement the supplemental functionality or content that adds a feature to the application.

16. The non-transitory machine-readable storage medium of claim 14, wherein to build the first application image, the processing device is to execute the at least one configuration script to configure the base image to utilize the corresponding dependencies.

17. The non-transitory machine-readable storage medium of claim 14, wherein the processing device is further to:
detect an update corresponding to the content from the add-on image; and
trigger a build of the second application image in the build container in response to detecting the update corresponding to the content from the add-on image.

* * * * *